(12) United States Patent
Endo

(10) Patent No.: US 7,819,455 B2
(45) Date of Patent: Oct. 26, 2010

(54) STRADDLE-TYPE VEHICLE

(75) Inventor: Masato Endo, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 209 days.

(21) Appl. No.: 11/961,078

(22) Filed: Dec. 20, 2007

(65) Prior Publication Data
US 2008/0157557 A1 Jul. 3, 2008

(30) Foreign Application Priority Data
Dec. 28, 2006 (JP) ............................ 2006-356607

(51) Int. Cl.
B60N 2/02 (2006.01)
(52) U.S. Cl. ............... 296/65.03; 296/65.05; 297/188.1
(58) Field of Classification Search ............. 296/65.03, 296/63, 65.05, 69, 65.06; 297/188.1, 188.13, 297/195.1, 214, 215.13, 215.15; 180/89.1, 180/219
See application file for complete search history.

(56) References Cited
U.S. PATENT DOCUMENTS 3,927,727 A * 12/1975 Hanagan ..................... 180/219
4,171,731 A * 10/1979 Hilber ......................... 180/219
4,413,700 A * 11/1983 Shiratsuchi .................. 180/219
4,577,719 A * 3/1986 Nomura et al. .............. 180/219
4,915,188 A * 4/1990 Ota et al. ..................... 180/219
5,040,632 A * 8/1991 Fujii et al. ................... 180/219
5,094,315 A * 3/1992 Taki et al. .................... 180/219
6,234,546 B1 * 5/2001 Asakura et al. ............. 292/165
7,232,171 B2 * 6/2007 Lan et al. .................... 296/37.1
2003/0102657 A1 * 6/2003 Kuo ............................ 280/755
2005/0017531 A1 * 1/2005 Nagashii ..................... 296/37.1

FOREIGN PATENT DOCUMENTS

JP 2001-130465 5/2001

* cited by examiner

Primary Examiner—Patricia L Engle
Assistant Examiner—SunSurraye Westbrook
(74) Attorney, Agent, or Firm—Keating & Bennett, LLP

(57) ABSTRACT

A straddle-type vehicle having a seat that pops up. A seat assembly has a front end section that is latched by a seat connection member. The seat assembly is elastically deformable in an upward-downward direction of the vehicle. The seat assembly is latched by a seat lock such that it is bent in the upward-downward direction when in a latched state.

10 Claims, 8 Drawing Sheets

STRADDLE-TYPE VEHICLE

RELATED APPLICATIONS

This application claims the benefit of priority under 35 USC 119 of Japanese patent application no. 2006-356607, filed on Dec. 28, 2006, which application is hereby incorporated by reference in its entirety.

BACKGROUND OF THE INVENTION

1. Field of the Invention

The invention relates to a lock mechanism of a seat for a straddle-type vehicle that causes an end section of the seat to pop up when released.

2. Description of Related Art

A straddle-type vehicle such as a motorcycle may have a luggage storage compartment beneath a seat that is turnably supported at one end section to allow access to the luggage storage compartment. In order to make the turning operation easier, and to make the operator aware that the lock mechanism is released, an end section of the seat may pop up when the lock mechanism is released. For example, a tongue-shaped member of the lock up mechanism may pop up the end section (see JP-A-2001-130465, pages 2-3, FIG. 2).

However, this method has a problem in that a seat pop up function must be incorporated into the lock mechanism, which makes the structure of the lock mechanism more complicated.

SUMMARY OF THE INVENTION

The invention has been devised in light of these circumstances and provides a straddle-type vehicle that uses a simple structure to cause a seat to pop up.

A straddle-type vehicle according to the invention comprises a seat having one end section that is latched by a holding member formed on a vehicle body side. A latching mechanism releasably holds an other end section of the seat in a latched state. The seat is elastically deformable in an upward-downward direction of the vehicle, and is bent in the upward-downward direction when latched by the latching mechanism.

According to the invention, when the seat is latched by the latching mechanism, the seat is bent in the upward-downward direction. Thus, when the latching of the seat is released by the latching mechanism, the elastically deformed seat returns to a shape before being deformed as a result of reaction force, thereby causing the other end section of the seat to pop up. Thus, a simple structure is used to cause the seat to pop up.

In one embodiment, a load receiving member abuts against and receives a load from the seat, and is disposed between the one end section and the other end section. The seat is in a bent state between the load receiving member and the other end section when latched by the latching mechanism.

In another embodiment, a turning support member turnably supports the one end section.

In another embodiment, the seat has a rider seat member on which a rider sits and a passenger seat member behind the rider seat member on which a passenger sits. The load receiving member is disposed between the rider seat member and the passenger seat member.

In a further embodiment, a luggage storage compartment is disposed beneath the seat and to the side of the turning support member. The load receiving member is provided at an end section of the luggage storage compartment that is to the side of the latching mechanism.

In a still further embodiment, the turning support member is provided at the luggage storage compartment.

Other features and advantages of the invention will be apparent from the following detailed description, taken in conjunction with the accompanying drawings which illustrate, by way of example, various features of embodiments of the invention.

DETAILED DESCRIPTION OF THE INVENTION

Figure 1:
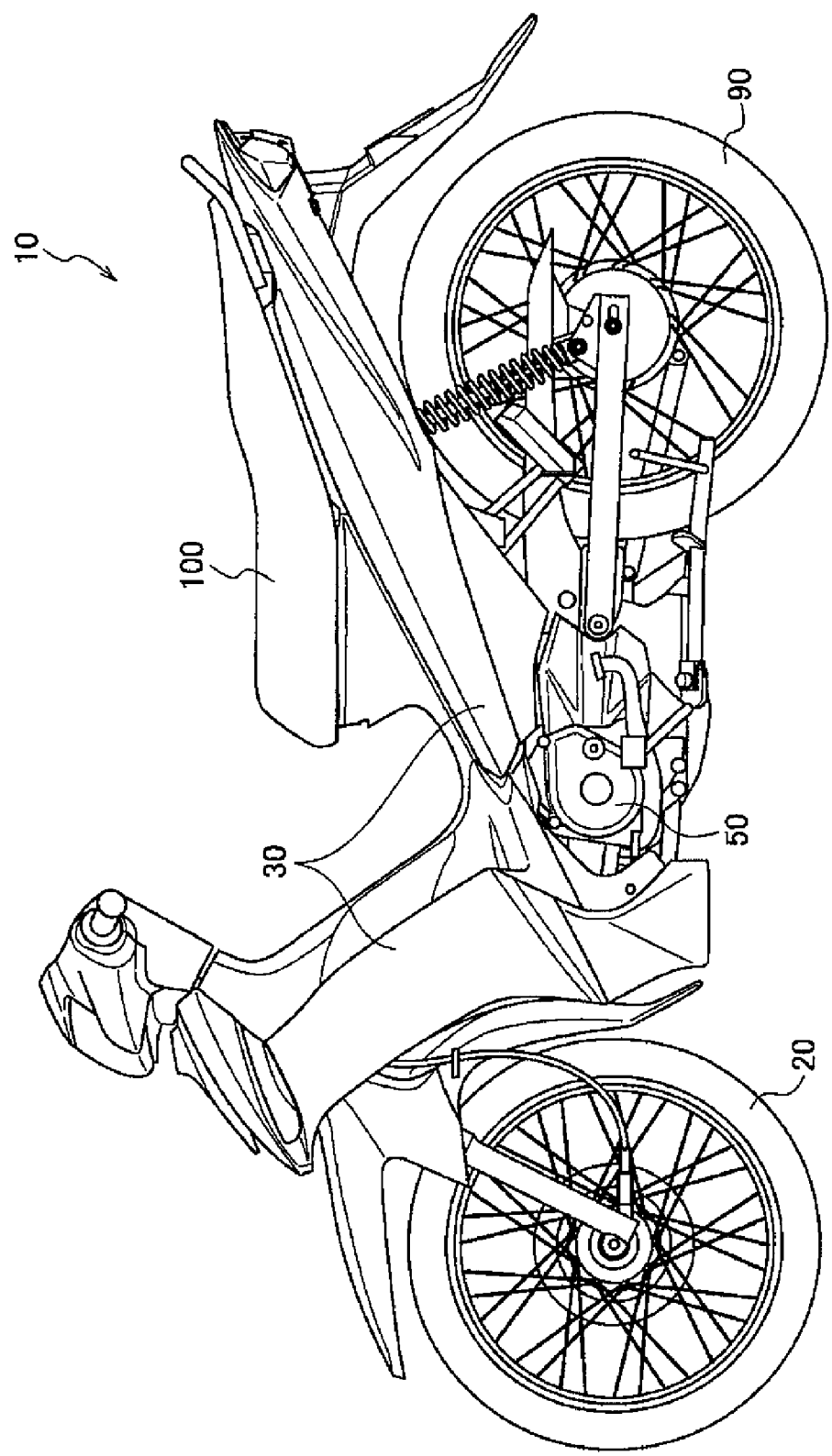
FIG. 1 is a left side view of a motorcycle according to an embodiment of the invention.

An embodiment of a straddle-type vehicle according to the invention is now described with reference to the drawings. In the drawings, structural members that are the same or similar are denoted with the same or similar reference numerals. The drawings are schematic, and thus the relative scale of dimensions and the like may be different from the real object. Specific dimensions and the like can be determined with reference to the following description. In addition, the relationship and scale of respective dimensions may vary from figure to figure.

(Overall Structure of the Straddle-Type Vehicle)

Figure 2:
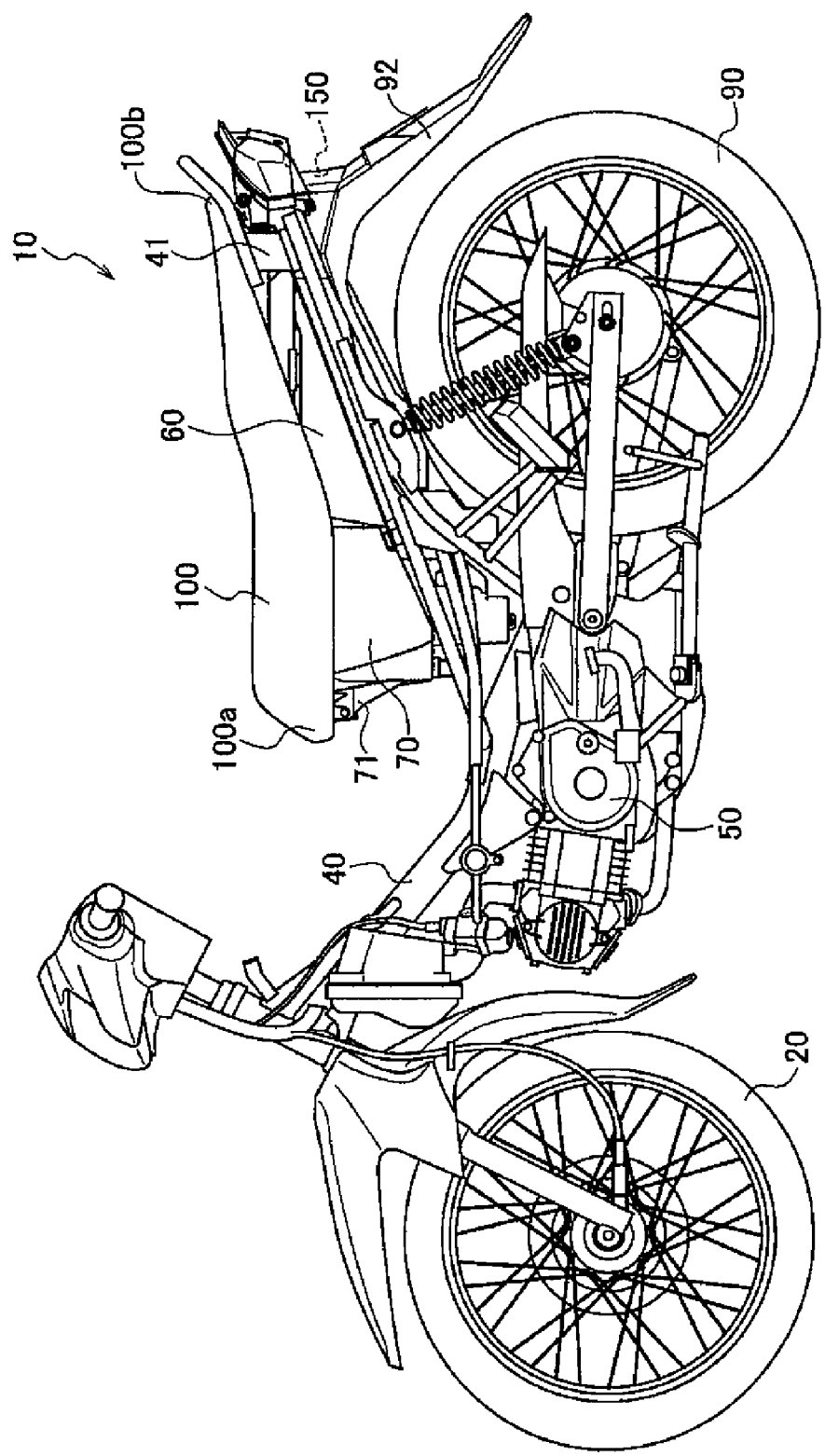
FIG. 2 is a left side view of the motorcycle with a vehicle body cover removed.

FIG. 1 is a left side view of a motorcycle 10 which is a straddle-type vehicle according to an embodiment of the invention. FIG. 2 is a left side view of motorcycle 10 with a body cover 30 removed. Motorcycle 10 is an underbone motorcycle that has a body frame 40 that is disposed further downward as compared to a standard saddle-type motorcycle. Motorcycle 10 has a front wheel 20 and a rear wheel 90 driven by driving force generated by an engine 50.

Motorcycle 10 has a tandem seat assembly 100 on which a rider (an operator) and a tandem rider (a passenger) sit. A luggage storage box 70 is disposed beneath seat assembly 100.

Tandem seat assembly 100 is latched by a seat connection member 71 formed at a vehicle body side thereof, namely, at luggage storage box 70, such that a front end section 100a (one end section) is turnable. In this embodiment, seat connection member 71 forms a latched member.

In addition, a rear end section 100b (other end section) of tandem seat assembly 100 is supported by a rear stay 41 that is formed on body frame 40. Rear end section 100b is latched by a seat lock 150 that is provided in an upper section of a rear fender 92.

Seat lock 150 holds rear end section 100b in a latched state. The latched state of seat lock 150 can be released by performing a determined operation. In this embodiment, seat lock 150 forms a latch mechanism. When the latched state of seat lock 150 is released, tandem seat assembly 100 can turn centering on front end section 100a, namely, can turn with rear end section 100b as a free end. When seat assembly 100 is turned, a fuel cap 61 provided in an upper section of a fuel tank 60 and luggage storage box 70 can be accessed.

When an operation is performed to release seat lock 150 from the latched state, rear end section 100b of seat assembly 100 pops upward by around 10 mm. Seat assembly 100 is elastically deformable in the upward-downward direction, and thus when the latched state of seat lock 150 is released, reaction force of seat assembly 100 itself causes seat assembly 100 to pop up. The structure related to the pop up of seat assembly 100 is described hereinafter.

Fuel tank 60 is disposed beneath tandem seat assembly 100 and to the rear of luggage storage box 70. Fuel tank 60 stores fuel that is supplied to engine 50.

(Structure of the Seat)

The structure of tandem seat assembly 100 is now explained.

(1) External Appearance

Figure 3:
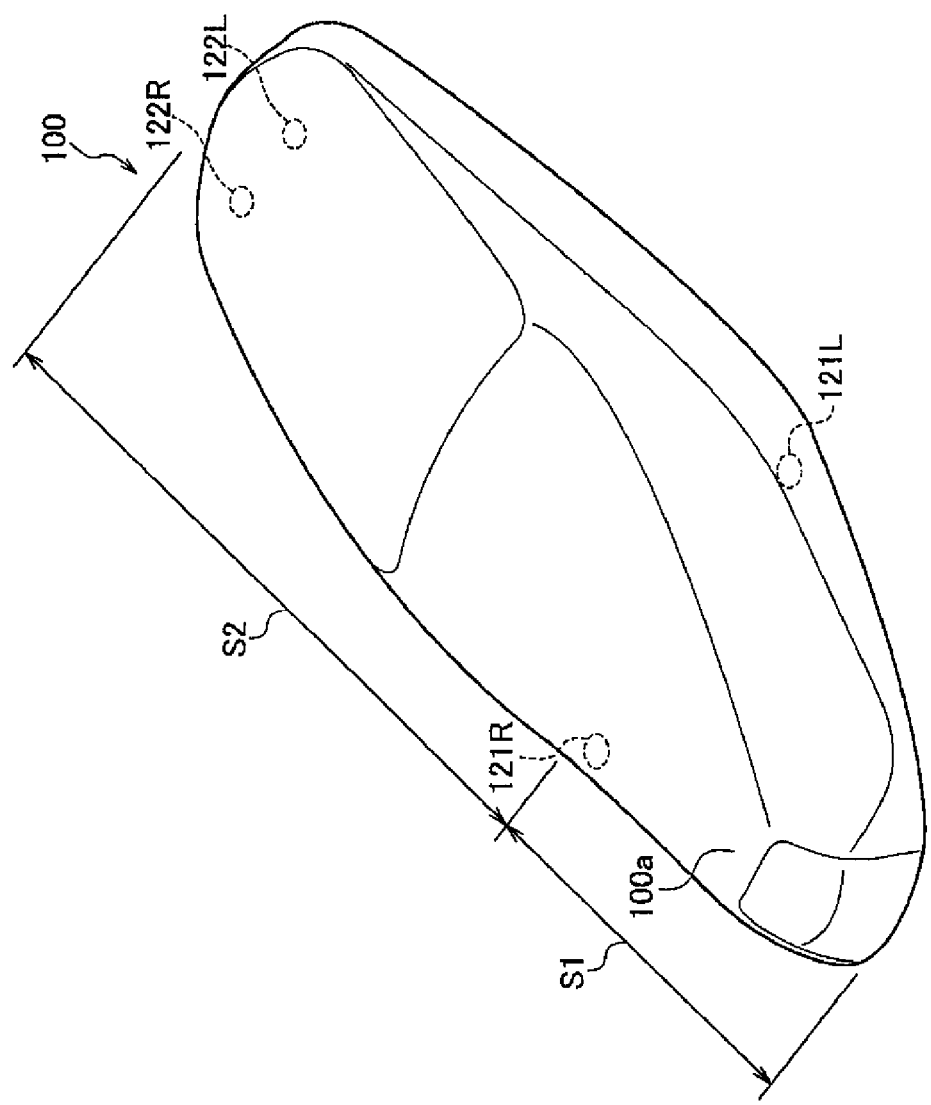
FIG. 3 is a perspective view of a seat according to an embodiment of the invention.

As shown in FIG. 3, which is a perspective view of tandem seat assembly 100, seat assembly 100 includes a rider seat member S1 on which the rider (operator) sits, and a passenger seat member S2 behind rider seat member S1 and on which the passenger sits.

Figure 5:
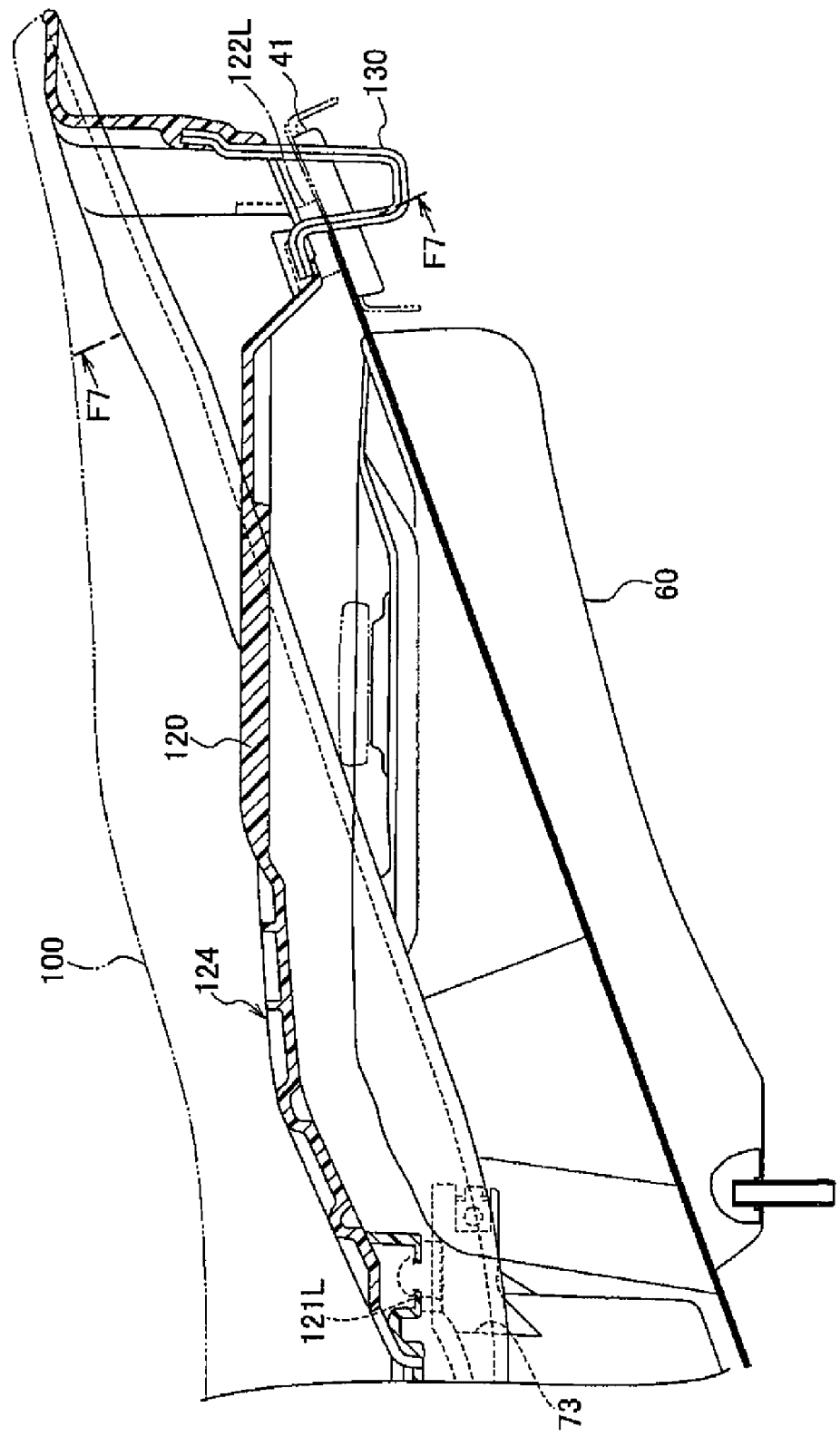
FIG. 5 is a rear side view of the seat.

Seat pads 121L, 121R are disposed beneath rider seat member S1 and abut against luggage storage box 70. More particularly, seat pads 121L, 121R abut against a seat support member 73 (FIG. 5). Seat pads 122L, 122R are disposed beneath passenger seat member S2 and abut against body frame 40. More particularly, seat pads 122L, 122R abut against rear stay 41 (FIG. 5).

Seat assembly 100 is supported at the vehicle body side, and more particularly is supported by luggage storage box 70 and body frame 40 via four points (seat pads 121L, 121R, 122L, 122R) in addition to front end section 100a being connected by seat connection member 71.

(2) Detailed Structure

Figure 4:
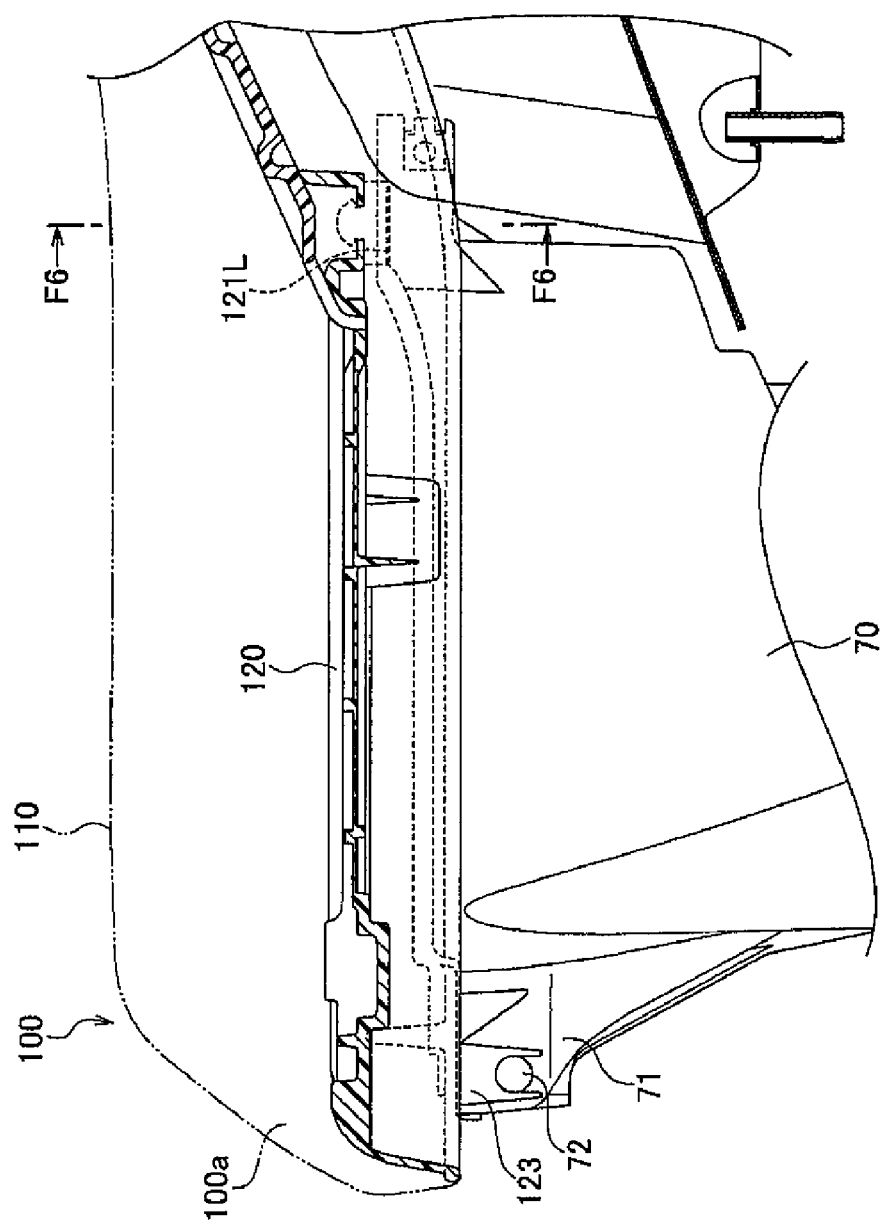
FIG. 4 is a front side view of the seat.

FIG. 4 is a side view of a front section of seat assembly 100. Luggage storage box 70 is also shown in FIG. 4. FIG. 5 is a side view of a rear section of seat assembly 100. Fuel tank 60 is also shown in FIG. 5. As can be seen from FIGS. 4 and 5, seat assembly 100 includes a seat cushion 110, a bottom plate 120 and a seat lock bar 130.

Bottom plate 120 is made of polypropylene and is provided at a bottom surface of seat cushion 110 on which a rider and/or a passenger sits. As shown in FIG. 4, bottom plate 120 has an attachment stay 123. Attachment stay 123 is turnably connected to seat connection member 71 that is formed at the front end of luggage storage box 70. An insertion hole through which a shaft 72 is inserted is formed in seat connection member 71 and attachment stay 123.

Shaft 72 is inserted in the vehicle width direction through the insertion hole formed in seat connection member 71 and attachment stay 123. Seat connection member 71 and shaft 72 form a turning support member that turnably supports front end section 100a of seat assembly 100. In addition, seat connection member 71 and shaft 72 are provided at luggage storage box 70. When attachment stay 123 is turned, rear end section 100b of seat assembly 100 moves toward the front of motorcycle 10 centering on shaft 72 and along a path that is arc shaped.

Luggage storage box 70 is disposed at the side of front end section 100a of tandem seat assembly 100, namely, at the side of the turning support member formed by seat connection member 71 and shaft 72.

As can be seen from FIG. 5, seat support member 73 is provided at a rear end of luggage storage box 70. Seat support member 73 abuts against and receives a load from tandem seat assembly 100. Rear stay 41 is provided at a position that faces seat lock bar 130, and abuts against and receives a load from seat assembly 100. Seat support member 73 and rear stay 41 form a load bearing member.

Seat support member 73 and rear stay 41 are disposed between front end section 100a and rear end section 100b. Moreover, seat support member 73 is disposed between rider seat member S1 and passenger seat member S2. Seat support member 73 is provided at the rear end of luggage storage box 70, namely, at an end section on the seat lock 150 side of luggage storage box 70.

Tandem seat assembly 100 has a structure that allows elastic deformation in the upward-downward direction of motorcycle 10. More particularly, bottom plate 120 has a section 124 that has an arch shape in side view. Bottom plate 120 that is supported by seat support member 73 abuts against rear stay 41 with arch shaped section 124 predominantly in a bent state, and seat lock bar 130 latched by seat lock 150.

Figure 6:
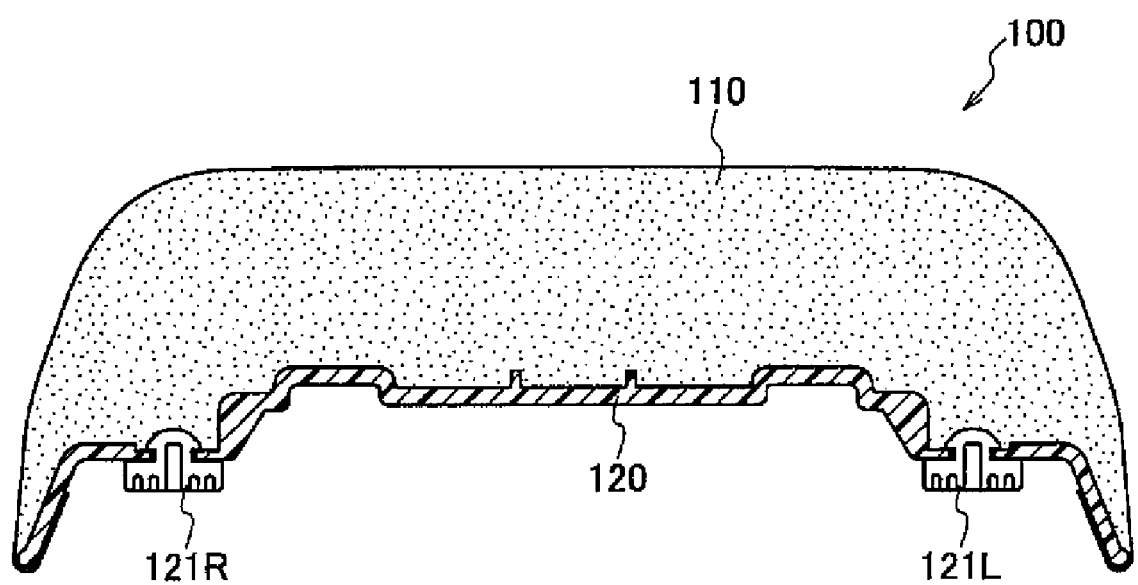
FIG. 6 is a cross sectional view of the seat along line F6-F6 of FIG. 4.
Figure 7:
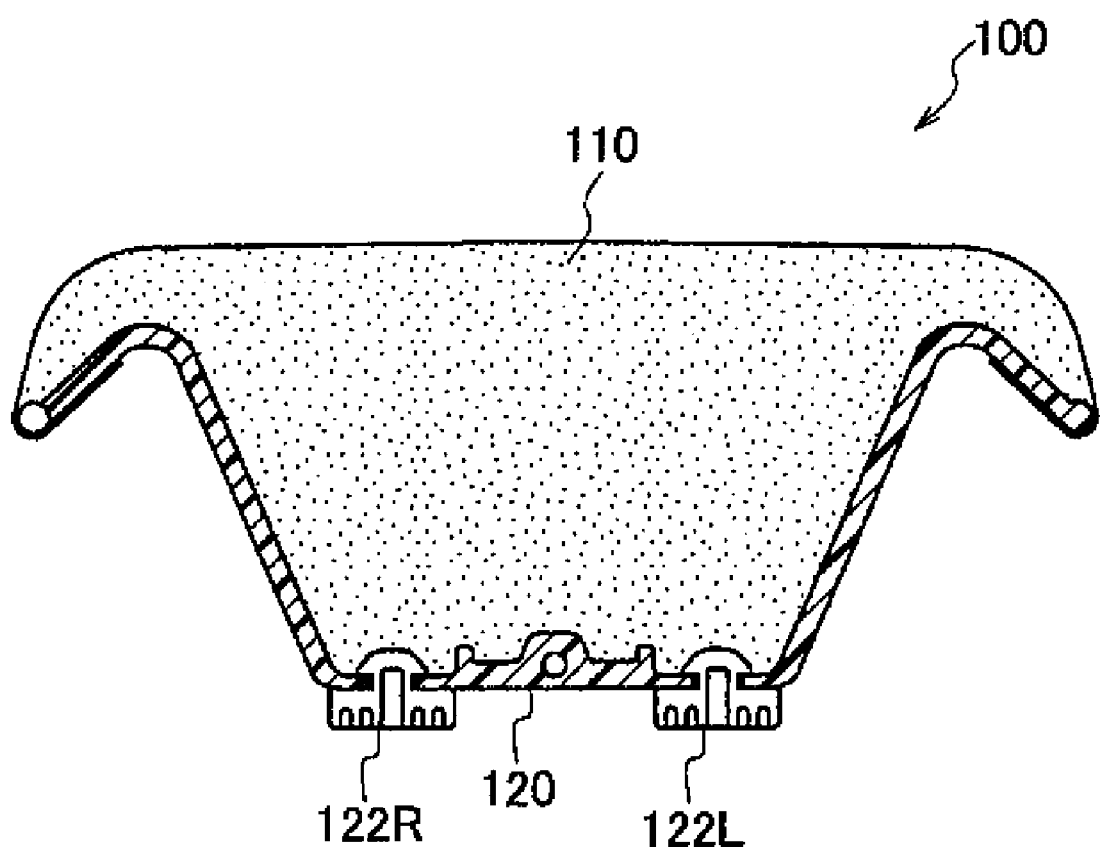
FIG. 7 is a cross sectional view of the seat along line F7-F7 of FIG. 5.

FIG. 6 is a cross sectional view of tandem seat assembly 100 along line F6-F6 shown in FIG. 4. FIG. 7 is a cross sectional view of tandem seat assembly 100 along line F7-F7 shown in FIG. 5.

As can be seen from FIGS. 4 and 6, seat pads 121L, 121R are provided in tandem seat assembly 100 at positions that face seat support member 73. In other words, seat support member 73 extends from the left to the right side of luggage storage box 70. As shown in FIGS. 5 and 7, seat pads 122L, 122R are provided in tandem seat assembly 100 at positions that face rear stay 41. In other words, rear stay 41 extends in the vehicle width direction. Seat pads 121L, 121R, 122L, 122R have a circular column shape as shown in FIG. 3, FIG. 6 and FIG. 7.

(3) Pop Up Mechanism

Figure 8:
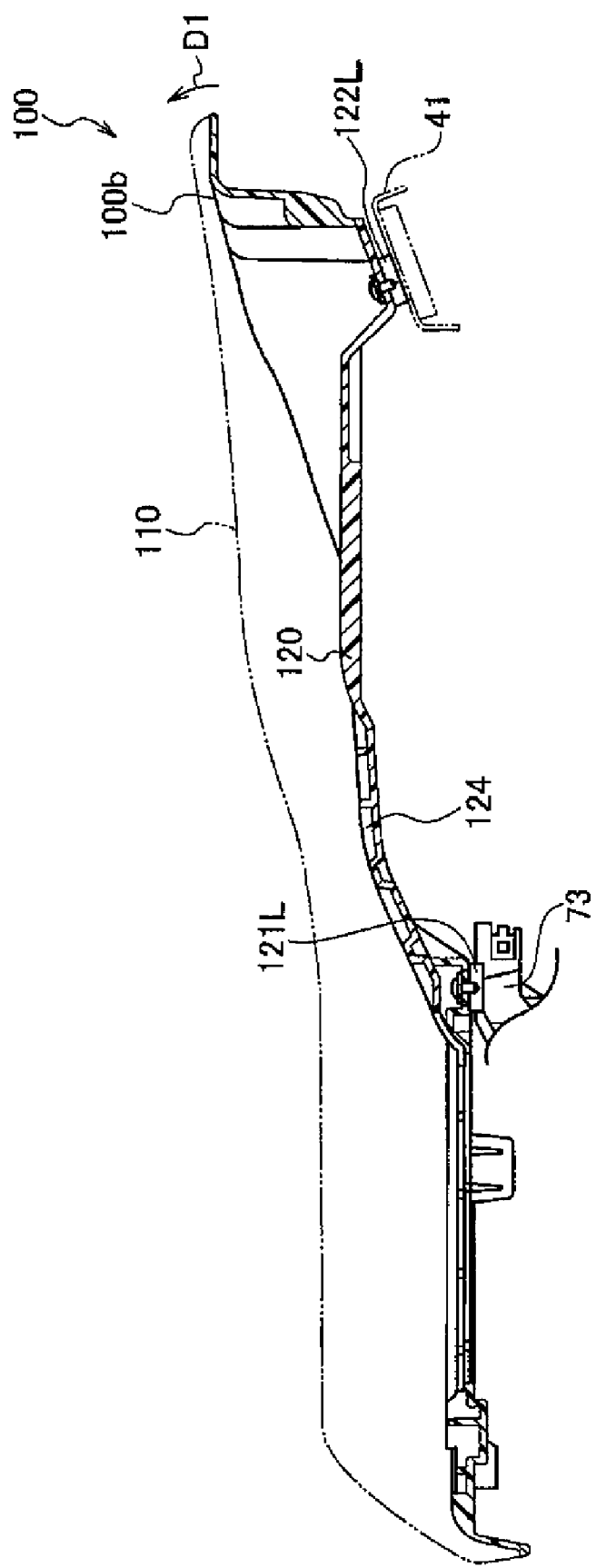
FIG. 8 is a left side view of the general outline of the seat.

FIG. 8 is a left side view of the overall tandem seat assembly 100. Seat assembly 100 is latched by seat lock 150 with seat pad 122L abutting against rear stay 41, namely, in a state where tandem seat assembly 100 is latched by seat lock 150 while bent in the upward-downward direction.

More particularly, tandem seat assembly 100 is latched by seat lock 150 while bent between seat support member 73 and rear end section 100b. Arch shaped section 124 formed between seat support member 73 and rear end section 100b is predominantly elastically deformed such that tandem seat assembly 100 can be bent.

A plurality of ribs is formed in arch shaped section 124 as shown in FIG. 8. As a result, the rigidity of tandem seat assembly 100 (bottom plate 120) is ensured while still being elastically deformable.

When seat lock 150 is released, rear end section 100b of tandem seat assembly 100, pops up in direction D1 as a result of the reaction force of arch shaped section 124 that is elastically deformed downward. The lift amount caused by pop up of rear end section 100b is around 10 mm.

(Operation & Advantages)

In motorcycle 10, when tandem seat assembly 100 is latched by seat lock 150, seat assembly 100 is bent in the upward-downward direction. Thus, when the latching of seat assembly 100 by seat lock 150 is released, the elastically deformed seat assembly 100 returns to its shape before being deformed as a result of reaction force. As a result, when the latching of seat assembly 100 by seat lock 150 is released, rear end section 100b pops up.

Thus, in motorcycle 10, there is no need to incorporate a pop up function for tandem seat assembly 100 inside seat lock 150, and seat assembly 100 is caused to pop up using a simple structure. In addition, since there is no need to incorporate a pop up function for seat assembly 100 inside seat lock 150, the seat can be caused to pop up regardless of the type or shape of the seat lock.

In this embodiment, seat support member 73 is disposed between front end section 100a and rear end section 100b of tandem seat assembly 100. Seat assembly 100 is latched by seat lock 150 such that seat assembly 100 is bent between seat support member 73 and rear end section 100b. In addition, seat support member 73 is provided at the rear end of luggage storage box 70, namely, at the end section on the seat lock 150 side of luggage storage box 70. Thus, the length of the section of the seat assembly 100 that elastically deforms can be set appropriately in accordance with the pop up lift amount or the like.

This embodiment is provided with the turning support member that turnably supports front end section 100a of tandem seat assembly 100, and more particularly is provided with seat connection member 71 and shaft 72. As a result, after tandem seat assembly 100 has popped up, tandem seat assembly 100 can easily be turned to allow access to luggage storage box 70, fuel cap 61 of fuel tank 60 and the like.

In addition, seat connection member 71 and shaft 72 are provided at luggage storage box 70. More particularly, the turning support member that turnably supports tandem seat assembly 100 is provided at the end section of luggage storage box 70. Thus, the gap between seat assembly 100 and luggage storage box 70 is reduced, and luggage storage box 70 is reliably covered.

In this embodiment, seat support member 73 is provided between rider seat member S1 and passenger seat member S2. Thus, seat support member 73 receives load of the rider (operator) and the tandem rider passenger).

OTHER EMBODIMENTS

One embodiment of the invention has been described to disclose the features of the invention. However, the invention is not limited by the description and drawings that constitute one section of the disclosure, and various modified forms of the invention will be apparent to those of skill in the art.

For example, the turning support member that turnably supports tandem seat assembly 100 has been described as provided at the end section of luggage storage box 70. However, the turning support member need not be provided at luggage storage box 70. For example, it may instead be provided at rear stay 41. In addition, the turning support member need not be provided at all, and front end section 100a of seat assembly 100 may be inserted to the vehicle body side.

Luggage storage box 70 is described as disposed at the location of turning support member, but this is not essential. For example, the positions of luggage storage box 70 and fuel tank 60 may be switched.

In addition, the position of seat support member 73 is not limited to that described in the above embodiment. For example, rather than being provided between rider seat member S1 and passenger seat member S2, seat support member 73 may be provided at fuel tank 60.

Bottom plate 120 is described as being made of polypropylene. However, bottom plate 120 may be made of metal, or a combination of a resin and metal.

In addition, tandem seat assembly 100 may be caused to pop up by bending just one section of seat assembly 100, for example, just passenger seat member S2.

As is apparent, the invention includes various modified embodiments not described herein. Accordingly, the scope of the invention is defined by the features of the invention as set forth in the following claims.

The invention claimed is:

1. A straddle-type vehicle comprising:
    a vehicle body;
    a seat including a first end section and a second end section disposed at an opposite end of the seat from the first end section, the first end section of the seat being pivotally supported on the vehicle body such that the second end section is arranged to be pivoted about the first end section among a raised position, a lowered position, and a latched position;
    a latching mechanism arranged to releasably hold the second end section of the seat to the vehicle body; wherein
    the seat is elastically deformable and configured such that, when the second end section is in the lowered position, the second end section is spaced away from the latching mechanism when no downward pressing force is applied to the second end section; and
    when the second end section is in the latched position and latched by the latching mechanism to the vehicle body, the seat is elastically deformed against an elastic restoring force of the seat when a downward pressing force is applied to the second end section.

2. The straddle-type vehicle according to claim 1, further comprising:
    a load receiving member arranged to abut against and receive a load from the seat; wherein
    the load receiving member is disposed between the first end section and the second end section; and
    the seat is bent between the load receiving member and the second end section when the second end section is latched by the latching mechanism.

3. The straddle-type vehicle according to claim 1, further comprising a turning support member arranged to pivotally support the first end section.

4. The straddle-type vehicle according to claim 2, wherein the seat includes a rider seat member on which a rider sits and a passenger seat member behind the rider seat member on which a passenger sits, and the load receiving member is disposed between the rider seat member and the passenger seat member.

5. The straddle-type vehicle according to claim 3, further comprising:
    a luggage storage compartment disposed beneath the seat; wherein
    the load receiving member is disposed at an end section of the luggage storage compartment closer to the latching mechanism than to an opposite end section of the luggage storage compartment.

6. The straddle-type vehicle according to claim 5, wherein the turning support member is provided at the luggage storage compartment.

7. The straddle-type vehicle according to claim 1, wherein when the latching mechanism releases the second end section of the seat, the elastically deformed seat returns to a shape before being deformed as a result of the elastic restoring force thereby causing the second end section of the seat to pop up to the lowered position and to be spaced away from the latching mechanism.

8. The straddle-type vehicle according to claim 7, wherein the second end section of the seat is spaced away from the vehicle body by approximately 10 mm when in the lowered position.

9. The straddle-type vehicle according to claim 1, wherein the seat includes a cushion and an arch-shaped, elastically-deformable bottom plate on which the cushion is disposed.

10. The straddle-type vehicle according to claim 9, wherein the bottom plate is made of polypropylene.

* * * * *